United States Patent [19]

Kawakami et al.

[11] 4,268,414

[45] May 19, 1981

[54] METHOD FOR REMOVING AND TREATING WASTE CATALYST

[75] Inventors: Katsuhiko Kawakami, Koganei; Kenji Komori; Hiroshi Megumi, both of Kurashiki, all of Japan

[73] Assignee: Nippon Mining Co., Ltd., Tokyo, Japan

[21] Appl. No.: 88,923

[22] Filed: Oct. 29, 1979

[30] Foreign Application Priority Data

Nov. 2, 1978 [JP] Japan ................................ 53-135383

[51] Int. Cl.³ .................... B01J 21/20; B01J 23/92; B01J 23/94; C10G 45/08
[52] U.S. Cl. .................................. 252/412; 208/113; 208/216 R; 252/414
[58] Field of Search ...................... 252/414, 412, 420; 208/52 CT, 216 R, 216 PP, 113

[56] References Cited

U.S. PATENT DOCUMENTS

| | | | |
|---|---|---|---|
| 1,933,508 | 10/1933 | Peck ..................................... | 252/414 |
| 3,436,318 | 4/1969 | Glass .................................. | 260/343.6 |
| 4,031,031 | 6/1977 | Yamaguchi et al. ................ | 252/414 |
| 4,079,016 | 3/1978 | Brahm et al. ..................... | 260/343.6 |
| 4,155,875 | 5/1979 | Yamaguchi et al. ................ | 252/414 |

*Primary Examiner*—P. E. Konopka
*Attorney, Agent, or Firm*—Sughrue, Rothwell, Mion, Zinn and Macpeak

[57] ABSTRACT

A method for removing and treating waste catalyst resulting from the catalytic reaction of hydrocarbons, characterized by wetting the catalyst with water or a mineral oil containing one or more lactones.

10 Claims, No Drawings

METHOD FOR REMOVING AND TREATING WASTE CATALYST

BACKGROUND OF THE INVENTION

1. Field of the Invention

This invention relates to a safe and simple method for treating a catalyst used for the catalytic reaction of hydrocarbons when the catalyst is removed from the reaction system.

2. Description of the Prior Art

In general, the catalysts used in the catalytic reaction of hydrocarbons such as naphtha, kerosene, gas oil or atmospheric residual oil are deactivated by catalyst poisons or coke deposits formed during the reaction. It therefore becomes necessary to remove the deactivated catalyst from the reactor and exchange it with a fresh catalyst on such occasions. However, the waste catalyst from the catalytic reaction of atmospheric residual oil is in the form of a hard cake which must be crushed mechanically before removal. A dust of the pulverized waste catalyst is generated as a result of, for example, impact at the time of removal, and the dust markedly affects the working environment. Furthermore, when the waste catalyst is removed into the atmosphere, the adhering matter is oxidized by oxygen in the air to generate heat, which in turn causes the adhering matter on the waste catalyst to burn, resulting in a spontaneous combustion of the waste catalyst.

Many attempts have been made to solve the problems involved in the removal of waste catalysts. Two recent proposals are (1) the circulation of an organic amine-containing mineral oil through the reactor to thereby clean and soften a hard cake of waste catalyst (Japanese Patent Publication No. 50033/77 corresponding to U.S. Pat. No. 4,155,875) and (2) wetting the waste catalyst with water or mineral oil in the presence of a surfactant alone or in combination with a chelating agent (Japanese Patent Publication No. 44755/77 corresponding to U.S. Pat. No. 4,031,031). Both methods either soften or wet a hard cake of waste catalyst and therefore are effective for preventing the formation of fines during removal and the hazardous spontaneous combustion. However, the removal of a hard catalyst cake that results from direct desulfurization of atmospheric residual oil requires a two-stage treatment wherein the cake is first softened by the method (1) and then wetted by the method (2). Moreover, one problem with this two-stage treatment is that part of the organic amine used in the method (1) is decomposed and forms ammonia and odorous lower amines which are detrimental to the working environment. Another problem is that the mineral oil used in the treatment must be deodorized before reuse.

SUMMARY OF THE INVENTION

Therefore, the primary object of this invention is to provide a safe and simple method for removing a waste catalyst from a reactor without the problems involved in the conventional technique.

A further object of the present invention is to provide a method for removing a waste catalyst from a reactor in which those agents which do not give off a malodor even if they are decomposed.

DETAILED DESCRIPTION OF THE INVENTION

According to the characteristic feature of this invention, the waste catalyst resulting from the catalytic reaction of hydrocarbons is wetted with lactone-containing water or mineral oils.

The catalysts to which the method of this invention can be applied include a wide range of catalysts used for catalytic reactions of hydrocarbons, for example, catalysts for the desulfurization of naphtha and kerosene, catalysts for the desulfurization and/or cracking of gas oils, and catalysts for the desulfurization and/or cracking of atmospheric residual oils and vacuum residual oils. More specifically, suitable examples of catalysts to which the process of this invention is applicable include a Co-Ni-Mo catalyst and a Co-Mo catalyst, supported on alumina or silica-alumina, and the like, as disclosed in U.S. Pat. Nos. 2,880,171 and 3,383,301.

Moreover, the catalysts which can be used may be either spherical or cylindrical. Where the catalyst particles have a spherical shape, particles having a diameter of about $\frac{1}{8}$ to 1/32 inches can be suitably processed in this invention and where the catalyst particles have a cylindrical shape, particles having a diameter of about $\frac{1}{8}$ to 1/32 inches and a length of about $\frac{1}{4}$ to $\frac{1}{8}$ inches can be suitably processed in this invention.

The liquid with which these waste catalysts are treated according to this invention has lactones contained in water or mineral oils such as naphtha, kerosene, gas oil and atmospheric residual oils which have a reduced asphaltene content and are rich in aromatics. Suitable mineral oils which can be used in this invention generally include kerosene (b.p. about 160° to 220° C.), gas oil (b.p. about 200° to 400° C.) and atmospheric residual oil (b.P. about 300° C. or higher), which can be obtained by the distillation of crude oil. Naphtha (b.p. about 35° to 200° C.) can also be used as the mineral oil in this invention, but it is not preferred from the standpoint of operational safety.

Suitable lactones are $\beta$-lactones, $\gamma$-lactones, $\delta$-lactones and large ring lactones. Of these lactones, those having 3 to 20 carbon atoms, preferably 4 to 10 carbon atoms and having a boiling point of about 50° to 350° C., preferably 100° to 300° C. are preferred, and of these butyrolactone, $\delta$-valerolactone and coumarin are most preferred. The lactones may be used alone or as a mixture in this invention. To make the treating liquid, about 0.005 to 20 wt%, preferably about 1 to 5 wt%, lactones are added to water or mineral oils and mixed intimately. The actual amount of lactones added varies within this range according to the degree of wetting desired. The type of lactone determines whether the resulting liquid is a solution or a dispersion.

The thus prepared treating liquid is circulated continuously through a product-free reactor to wet the waste catalyst. Alternatively, before wetting, the catalyst and the inside of the reactor may be cleaned with a cleaning solvent such as gas oil. In this case, the cleaning solvent may be mixed with a suitable amount of lactones.

The wetting treatment is preferably performed at a temperature between 50° and 350° C. and at a pressure of 0 to 150 Kg/cm²·G, preferably 0 to 100 Kg/cm²·G in the atmosphere of hydrogen or an inert gas such as nitrogen. Furthermore, the more preferred procedure to be applied in this invention will be set forth below.

After the operation of the desulfurization system is stopped, the cleaning solvent is heated to temperature at which the cleaning solvent does not cause a hydrogenation reaction to occur and the cleaning solvent is introduced into the desulfurization reactor while reducing the feeding amount of the feed oil. The feed amount of the feed oil is further reduced while increasing the feed amount of the cleaning solvent and finally the feeding of the feed oil is completely stopped. The cleaning solvent replaces the feed oil during the passage thereof through the catalyst layer. Since the cleaning solvent passing through the catalyst layer dissolves metal sulfides and tars having a high viscosity and is contaminated by these materials, a fresh cleaning solvent is supplied thereto until the content of the contaminants in the total cleaning solvent in the system becomes less than about 2% by weight, as sulfur.

When the content of the contaminants in the total cleaning solvent becomes sufficiently low, the supply of the fresh cleaning solvent is stopped and after changing the system into a system in which the cleaning solvent is circulated for washing the catalyst, the lactone as described above is added to the cleaning solvent. The lactone can be previously added to the cleaning solvent prior to the supply of the cleaning solvent to the system or the cleaning solvent can be supplied to the system while adding the lactone to the cleaning solvent but preferably the lactone is added to the cleaning solvent which is supplied to the system after replacing the feed oil in the system with a cleaning solvent which does not contain any lactone. In this case, hydrogen gas is, as a matter of course, circulated through the system until the cleaning operation for the catalyst is completed.

The circulation of the lactone-containing cleaning solvent for washing the catalyst is preferably carried out for a long period of time, usually for about 5 to 20 hours. That is, the lactone-containing cleaning solvent is circulated in an amount of about 50 to 100% by volume of the feed amount per hour over a period of about 5 to 20 hours. Then, while the amount of the cleaning solvent supplied is reduced or the supply of the cleaning solvent supplied is completely stopped, the cleaning solvent is removed from the system, and the temperature and pressure of the system are reduced to ambient temperature and atmospheric pressure, respectively, to stop the softening and wetting operation of the caked catalyst. Thereafter, the hydrogen gas in the system is replaced with nitrogen gas. The lactones contained in the treating liquid of this invention will not give off a malodor even if they are decomposed, and therefore, this invention does not require the deodorizing step that has been necessary in the technique using organiz amines.

As described in the foregoing, according to this invention a hard cake of waste catalyst resulting from the catalytic reaction of hydrocarbons (e.g. desulfurization of atmospheric residual oil) can be removed from the reactor in a single step without the problems of spontaneous combustion and fines.

This invention is now described in greater detail by reference to the following examples which are given here for illustrative purposes only and are by no means intended to limit the scope of the invention.

EXAMPLE 1

In the removal of a catlyst used in an atmospheric residual oil direct-desulfurizing unit, the waste catalyst and the inside of the unit were washed with a gas oil (b.p. 200° to 340° C.) during a normal shut-down of the operation. After this washing operation, 1 wt% of butyrolactone was added to the gas oil while maintaining the washing temperature (150° C.) and pressure (94 Kg/cm$^2$·G), and the mixture was circulated continuously for 8 hours. Then, the operation was completely stopped. After the operation was stopped, the gas oil within the reactor loaded with the waste catalyst was sufficiently purged off, and the reactor was opened to remove the waste catalyst. Neither dust scattering nor spontaneous combustion of the catalyst occurred during the removal of the waste catalyst. The withdrawn gas oil was free from any malodor and therefore could be reused without any deodorizing treatment.

EXAMPLES 2 TO 4

Waste catalyst removed from a reactor of an atmospheric residual oil direct-desulfurizing unit was treated with hydrogen and hydrogen sulfide to increase its oxidizability, and then wetted with a gas oil (b.p. 200° to 340° C.) containing the lactones indicated in Table 1 below at 190° C. for 6 hours. The so treated catalyst samples were checked for (1) the generation of heat as a result of sudden oxidation in an oxygen stream and (2) the crushing strength (hardness) of the treated catalyst as measured by a Kiya-type side crushing strength tester. The results are set forth in Table 1 wherein CONTROL indicates a catalyst sample that was not treated by the method of this invention. The table clearly shows that this invention prevents the spontaneous combustion of the catalyst and softens the same.

TABLE 1

| | Wetting Agent | Heat Generation | Average Crushing Strength (50 Samples) (Kg) |
|---|---|---|---|
| Example 2 | 5% Butyrolactone 95% Gas Oil | No | 3.9 |
| Example 3 | 5% δ-Valerolactone 95% Gas Oil | No | 4.2 |
| Example 4 | 5% Coumarin 95% Gas Oil | No | 3.7 |
| Control | Nil | Yes | 6.3 |

While the invention has been described in detail and with reference to specific embodiments thereof, it will be apparent to one skilled in the art that various changes and modifications can be made therein without departing from the spirit and scope thereof.

What is claimed is:

1. A method for removing and treating a waste catalyst resulting from the desulfurization and/or cracking of hydrocarbons, characterized by wetting said catalyst with water or a mineral oil containing one or more lactones.

2. The method of claim 1, wherein the lactones are β-lactones, γ-lactones, δ-lactones and large ring lactones.

3. The method of claim 2, wherein the lactones are lactones having 3 to 20 carbon atoms and having a boiling point of about 50° to 350° C.

4. The method of claim 1, wherein said water or mineral oil contains about 0.005 to 20 wt% of lactones.

5. The method of claim 4, wherein said water or mineral oil contains about 1 to 5 wt% of lactones.

6. The method of claim 1, wherein the wetting treatment is performed at a temperature of about 50° to 350° C.

7. The method of claim 1, wherein the wetting treatment is performed at a pressure of 0 to 150 Kg/cm$^2$·G in the atmosphere of hydrogen or an inert gas.

8. The method of claim 7, wherein the inert gas is nitrogen.

9. The method of claim 1, wherein before the wetting treatment, the catalyst and a reactor used are cleaned with a cleaning solvent.

10. The method of any of claims 1 to 9, wherein said catalyst is wet with a mineral oil containing said lactones.

* * * * *